(12) United States Patent
Abad Huber et al.

(10) Patent No.: US 9,234,364 B2
(45) Date of Patent: Jan. 12, 2016

(54) SUPPORT STRUCTURE FOR WIND-DRIVEN POWER GENERATORS AND MOLD FOR OBTAINING SUCH STRUCTURES

(71) Applicant: GESTAMP HYBRID TOWERS, S.L., Madrid (ES)

(72) Inventors: Cesar Abad Huber, Madrid (ES); Jorge Franco Rey, Madrid (ES)

(73) Assignee: GESTAMP HYBRID TOWERS, S.L., Madrid (ES)

( * ) Notice: Subject to any disclaimer, the term of this patent is extended or adjusted under 35 U.S.C. 154(b) by 0 days.

(21) Appl. No.: 14/432,585

(22) PCT Filed: Oct. 1, 2013

(86) PCT No.: PCT/ES2013/070676
§ 371 (c)(1),
(2) Date: Mar. 31, 2015

(87) PCT Pub. No.: WO2014/053688
PCT Pub. Date: Apr. 10, 2014

(65) Prior Publication Data
US 2015/0247335 A1    Sep. 3, 2015

(30) Foreign Application Priority Data
Oct. 1, 2012   (ES) .................................. 201231518

(51) Int. Cl.
*E04C 5/08*       (2006.01)
*E04H 12/00*      (2006.01)
(Continued)

(52) U.S. Cl.
CPC ................ *E04H 12/12* (2013.01); *E04C 2/044* (2013.01); *E04C 2/44* (2013.01); *E04C 5/08* (2013.01); *E04H 12/00* (2013.01); *E04H 12/34* (2013.01); *E04B 2103/02* (2013.01)

(58) Field of Classification Search
CPC ..... E04B 2103/02; E04H 12/00; E04H 12/12; E04H 12/34; E04C 2/044; E04C 2/44; E04C 5/08
USPC .................................. 52/599, 604, 605, 649.2
See application file for complete search history.

(56) References Cited

U.S. PATENT DOCUMENTS 4,741,875 A * 5/1988 Carraro ......................... 264/228
7,739,843 B2 * 6/2010 Cortina-Cordero .......... 52/223.5
(Continued)

FOREIGN PATENT DOCUMENTS

DE           549613 C     4/1932
DE     202007003842 U1    5/2007
(Continued)

OTHER PUBLICATIONS

Search report and written opinion issued by EPO dated Jul. 9, 2014.

*Primary Examiner* — Charles A Fox
*Assistant Examiner* — Joseph J Sadlon
(74) *Attorney, Agent, or Firm* — Michael B. Fein; Eckert Seamans Cherin & Mellott, LLC

(57) ABSTRACT

The present invention relates to a frustoconical- or truncated pyramid-shaped support structure for wind-driven power generators which is formed by several precast concrete panels having the same dimensions, without horizontal joints between panels, which allows obtaining different section widths by means of a platform-guide that can be adjusted to one of said panels.

4 Claims, 4 Drawing Sheets

(51) Int. Cl.
*E04H 12/12* (2006.01)
*E04C 2/04* (2006.01)
*E04B 2/00* (2006.01)
*E04H 12/34* (2006.01)

(56) References Cited

U.S. PATENT DOCUMENTS

2009/0019816 A1* 1/2009 Lockwood et al. ............. 52/848
2010/0071301 A1 3/2010 Herrius de Roest
2011/0138704 A1* 6/2011 Bagepalli et al. ............... 52/147
2013/0212963 A1* 8/2013 Miks et al. ................... 52/223.4

FOREIGN PATENT DOCUMENTS

| DE | 102010010973 A1 | 9/2011 |
| EP | 0214420 A2 | 3/1987 |
| EP | 1474579 B1 | 11/2006 |
| EP | 2369096 A2 | 9/2011 |
| FR | 2371562 A1 | 6/1978 |
| WO | 00/71317 A1 | 11/2000 |

* cited by examiner

SUPPORT STRUCTURE FOR WIND-DRIVEN POWER GENERATORS AND MOLD FOR OBTAINING SUCH STRUCTURES

CROSS-REFERENCE TO RELATED APPLICATIONS

This application is the U.S. national stage of PCT/ES2013/070676 filed Oct. 1, 2013, which claims priority from Spanish application P201231518 filed Oct. 1, 2012, both of which are hereby incorporated by reference.

OBJECT OF THE INVENTION

The present invention relates to a frustoconical- or truncated pyramid-shaped support structure for wind-driven power generators which is formed by several precast concrete panels having the same dimensions, which has no horizontal joints between panels since they have the total height of said support structure. The panels are designed such that the vertical joints have a larger opening in the upper portion than in the lower portion to enable obtaining different section widths in the upper portion of this structure. To achieve this objective, a height-adjustable platform is incorporated to one of the panels forming part of the structure object of this patent, which in turn serves as a guide for the correct and easy positioning of the remaining panels.

Another object of the invention is the mold with which said support structures are obtained.

Once the support structure of the present invention is produced, the wind turbine is directly incorporated or an additional metal tower can be incorporated to obtain greater heights.

This new invention aims to considerably reduce the production costs of such structures, considerably improving completion times and allowing obtaining different section widths necessary for housing wind turbines of different manufacturers in a simple and cost-effective manner.

Likewise, the drawback of the costly and complex production of horizontal attachments for precast panels of other systems that exist on the market today is solved, which further allows providing the structure with high structural rigidity.

It must also be highlighted that only one mold is enough to manufacture a support structure according to the present invention of any height.

The present invention is comprised in the construction sector and more specifically in producing support structures for wind-driven power generators.

BACKGROUND

Today there are different support structure systems for wind-driven power generators depending on the type of material used for manufacture, such as wood, steel or concrete.

Wood support structures have a height limitation of about 20 m.

The most commonly used generator support towers are metal towers with either a lattice structure or a hollow frustoconical or cylindrical shape. Such towers has a series of problems such as the need for constant maintenance with treatments protecting them from rust and the short operative duration thereof due to material wear caused by fatigue (as a result of the constant tension and compression cycles caused by wind force that the towers must withstand).

Furthermore, they have the added problem that they are only usable both technically and economically for heights less than 100 m due to the high cost involved in forming sections greater than 4.5 meters in diameter at the base, because they could not be transported by road since they would not pass under the number of bridges from the factory to the wind farm.

Therefore, the range of use of such metal structures ranges from 20 m to 100 m.

Today there are different designs of support structures for wind-driven power generators made of reinforced concrete, however none of them can compete with the aforementioned metal structures in terms of pricing and ease of assembly. Such structures have the drawback of incorporating several horizontal joints between the panels forming it, requiring very expensive molds for manufacture and complex attachments of all the panels to one another based on on-site tensioning cables.

Due to the high cost of concrete support structures, they are used for heights that cannot be achieved at a reasonable or competitive cost using metal structures, i.e., 100 m and higher.

The concrete support structure for wind-driven power generators object of this invention has a series of improvements over the existing structures which allow competing with and economically improving the solution of metal structures in the range of heights from 20 to 100 m. Likewise, by means of incorporating a simple transition part it allows obtaining greater heights.

The applicant is aware of the existence of other support structures such as the case of the patent with publication number EP1474579 which discloses a structure with several segments in height, all the horizontal joints generated having to be resolved, a subsequent post-tensioning being performed on-site by attaching all the panels with cables along the entire height thereof and always outside the concrete section, the panels being of a different geometry, whereby it is necessary to manufacture several molds.

U.S. Pat. No. 2,326,010 discloses a structure that is virtually identical to the preceding structure also formed by at least two segments in height with a decreasing section, whereby it needs more than one mold to precast the panels.

Patent number US2009307998 discloses an original support structure solution formed by a ring-shaped foundation associated with two concrete segments. The peculiar feature of this structure is that it has virtually the same width as the foundation where it rests, whereby the amount of concrete and steel of the structure increases considerably, with the subsequent additional cost.

The German company ENERCON markets and manufactures a structure formed by a number of concrete rings which are post-tensioned vertically on-site, attaching several ring segments at a time with cables. This solution greatly slows down assembly due to the large amount of horizontal attachments that must be resolved.

Patent number EP2420639 discloses a solution in which all the concrete elements together with the transition part are post-tensioned continuously on-site, anchoring the cables to the foundation. The post-tensioning cables are arranged outside the concrete section. This patent details the transition part, but does not define how the concrete segment is formed. The same author discloses a variant in patent number EP2402529, disclosing a corrugated concrete section that is very hard to produce.

The present invention discloses a frustoconical- or truncated pyramid-shaped support structure for wind-driven power generators which is formed by several precast concrete panels having identical dimensions, which has no horizontal joints between panels since they have the total height of said support structure. The panels are designed such that the vertical joints have a larger opening in the upper portion than in the lower portion to enable obtaining different section widths in the upper portion of this structure.

The improvements of the present invention over the existing concrete structures are:
- The absence of horizontal joints with the subsequent assembly time and cost savings.
- Different section widths can be obtained in the upper portion to enable adjustment to different measurements of turbines from different manufacturers.
- All the panels have the same dimensions, whereby saving in investing in molds. This improvement along with the foregoing improvement allows using a single mold for all kinds of heights and widths.
- On-site post-tensioning along the entire height for anchoring to the foundation is not necessary, which reduces assembly times and costs.
- Post-tensioning cables are in no case arranged outside the concrete section which drastically reduces maintenance operations with respect to solutions that do contemplate said outer cables.

DESCRIPTION OF THE INVENTION

The support structure for wind-driven power generators object of this invention is formed by several precast concrete panels forming a frustoconical or truncated pyramid shape.

All the panels forming the structure have the same dimensions, one of them being able to incorporate a door or window opening, and have the total height of said support structure so there are no horizontal joints between panels.

The panels are designed such that the vertical joints formed when joining two contiguous panels have a larger opening in the upper portion than in the lower portion to enable obtaining different section widths in the upper portion of this support structure, whereby it perfectly adapts to different configurations of wind turbine manufacturers.

To control the opening and to obtain the desired section width, a height-adjustable platform is incorporated anchored to the first panel forming part of the support structure object of this patent, which in turn serves as a guide for the correct and easy positioning of the remaining panels since it has a fixed geometry concentric to the desired section. This platform is disassembled once all the panels forming the support structure have been placed.

The concrete panels can be precast in a fixed installation or on-site and are pre-tensioned or post-tensioned before the placement thereof, not requiring any additional tensioning cable on-site. Panels of great heights will preferably be precast on-site.

The panels are precast in a single mold having a fixed geometry, being able to form support structures with the same angle between the vertical and the generatrix (in the case of a frustoconical configuration) or apothem (in the case of a truncated pyramid configuration) regardless of the height of the structure to be achieved, by simply placing spacers on this mold for limiting the total height of the panel.

The attachment of the support structure object of this invention to the foundation is performed locally in the lower area of the panels through a dual combination of passive steel with active steel, the passive steel projecting from the precast panel itself and anchored to the foundation, whereas the active steel is carried out by means of threaded bars emerging from the foundation and anchored in the lower portion of the precast element. For that purpose, the panels have a thickening in the lower portion so that the compressions generated by the active steel are centered in the section in contact with the foundation.

The designed structure does not require any additional cable on-site for attaching the panels to the foundation, cables not being arranged outside the concrete section in any case, which drastically reduces maintenance operations with respect to the solutions that contemplate outer cables.

A steel tower can be coupled on the support structure of this patent by means of a transition part of a mixed steel-concrete composition in order to obtain greater height.

This transition part has a hollow cylinder shape, its height being less than half its outer diameter and its wall thickness is at least twice the minimum thickness of the precast panels forming the support structure.

Another object of the invention is the mold with which the precasting of the panels is performed; said precasting is performed in a single mold having a fixed geometry, being able to form support structures with the same angle between the vertical and the generatrix regardless of the height of the tower to be achieved, by simply placing spacers on this mold for limiting the total height of the panel.

BRIEF DESCRIPTION OF THE DRAWINGS

To complement the description that is being made for the purpose of aiding to better understand the features thereof, a set of drawings is attached to the present specification in which the following has been depicted with an illustrative and non-limiting character.

PREFERRED EMBODIMENT OF THE INVENTION

Figure 1:
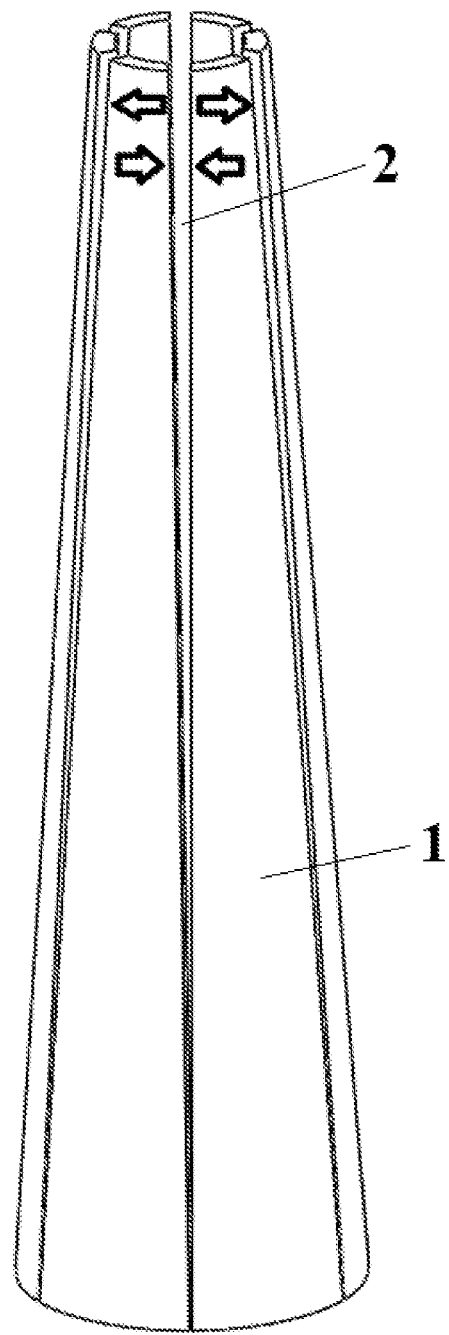
FIG. 1 shows a perspective view of the assembled support structure.
Figure 2:
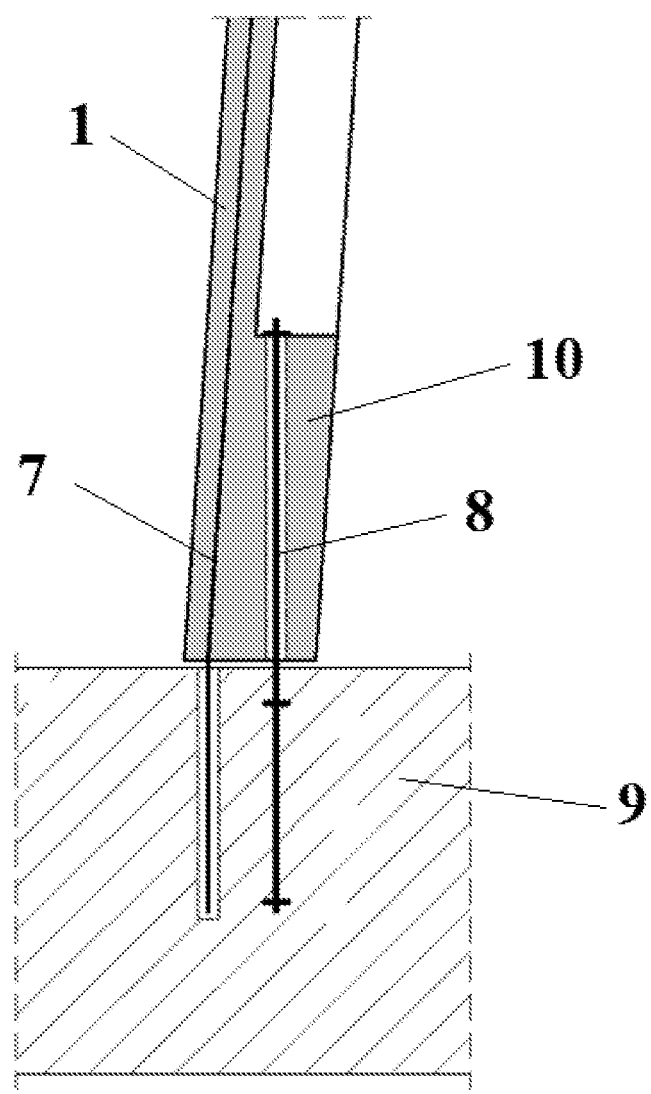
FIG. 2 shows a detail of the dual attachment with the foundation.
Figure 3:
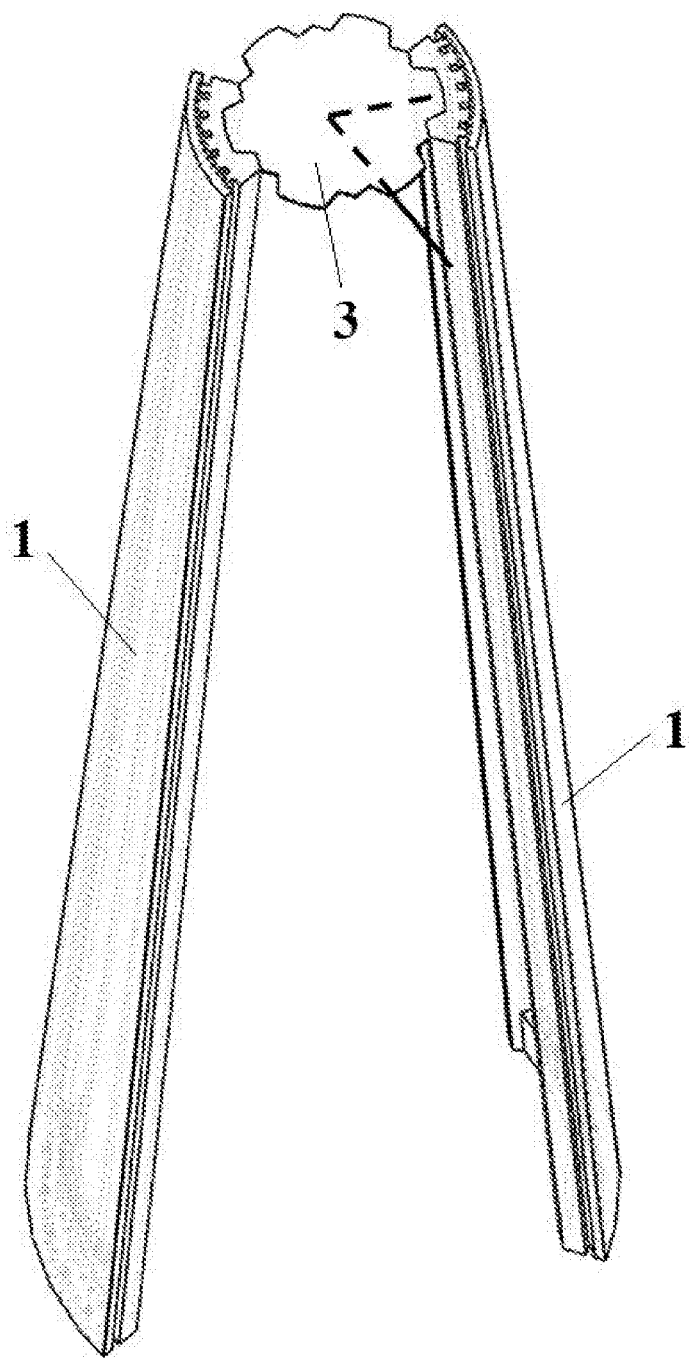
FIG. 3 shows a perspective view of the upper assembly platform.
Figure 4:
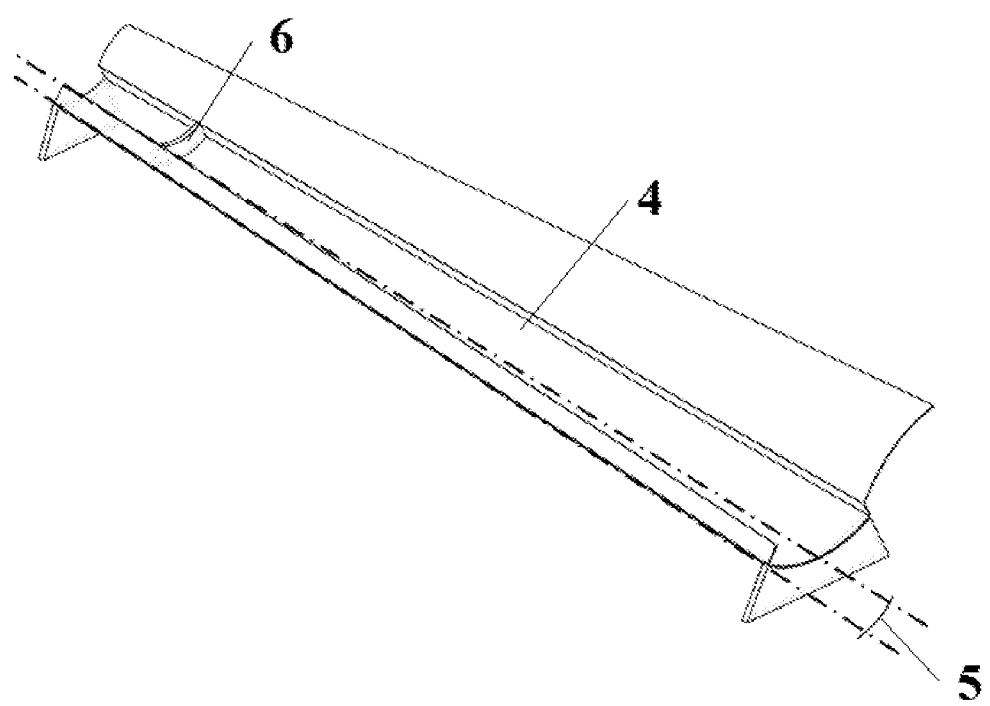
FIG. 4 shows a perspective view of the mold for precasting the panels.

The support structure for wind-driven power generators object of this invention is formed by several precast concrete panels (1) forming a frustoconical shape.

All the panels (1) forming the support structure have the same dimensions and have the total height of said support structure so there are no horizontal joints between panels.

The panels are designed such that the vertical joints (2) formed when joining two contiguous panels have a larger opening in the upper portion than in the lower portion to enable obtaining different section widths in the upper portion of this support structure, whereby it perfectly adapts to different configurations of wind turbine manufacturers.

To control the opening and to obtain the desired section width, a height-adjustable platform (3) is incorporated anchored to the first panel forming part of the tower support object of this patent, which in turn serves as a guide for the correct and easy positioning of the remaining panels (1), since it has a fixed geometry concentric to the desired section.

The concrete panels can be precast in a fixed installation or on-site and are pre-tensioned or post-tensioned before the placement thereof, not requiring any additional tensioning cable on-site.

The panels are precast in a single mold (4) having a fixed geometry, being able to form support structures with the same angle (5) between the vertical and the generatrix regardless of the height of the tower to be achieved, by simply placing spacers (6) on this mold for limiting the total height of the panel.

The attachment of the support structure object of this invention to the foundation (9) is performed in a thickened lower area (10) of the panels through a dual combination of passive steel (7) with active steel (8), the passive steel (7) projecting from the precast panel (1) itself and anchored to the foundation (9), whereas the active steel (8) is carried out by means of threaded bars emerging from the foundation and anchored in the lower portion of the precast element. The designed structure does not require any additional cable on-site for attaching the panels to the foundation.

A steel tower can be coupled on the support structure of this patent by means of a transition part of a mixed steel-concrete composition in order to obtain greater height. The panels have a thickening in the upper portion for that purpose.

This transition part has a hollow cylinder shape, the height of which is less than half its outer diameter and its wall is at least twice the minimum thickness of the precast panels forming the support structure.

The invention claimed is:

1. A frustoconical or truncated pyramid-shaped support structure formed by several precast concrete panels, characterized in that it has no horizontal joints between panels since all of them have a total height of said structure, all the panels (1) having the same dimensions, at least two of these panels being located contiguous to one another to form a support structure having a closed section and being designed such that vertical joints (2) between contiguous panels have a larger opening in an upper portion than in a lower portion, which allows obtaining different section widths in the upper portion of the mentioned structure by adjusting said opening, wherein the first panel that will be assembled on-site incorporates a platform (3) having fixed dimensions and the shape of which is concentric to the final section to be obtained, being anchored at a certain height of the upper portion of this panel, serving as a guide and support for the remaining panels and allowing the adjustment of section width in the upper portion of the tower by simply changing the anchoring height of said platform (3).

2. The frustoconical- or truncated pyramid-shaped support structure formed by several precast concrete panels according to claim 1, characterized in that the panels (1) have a thickening (10) in the lower portion having a thickness at least twice the minimum thickness of the panel which allows attaching the support structure to the foundation through a dual combination of passive steel (7) with active steel (8), the passive steel (7) projects from the precast panel itself and is anchored on the foundation (9), and the active steel (8) is carried out by means of threaded bars emerging from the foundation and anchored in the lower portion of the precast element.

3. The frustoconical- or truncated pyramid-shaped support structure formed by several precast concrete panels according claim 1, characterized in that the panels (1) are pre-tensioned or post-tensioned internally, i.e., inside the concrete section, before the placement thereof, not requiring any additional tensioning cable on-site.

4. The frustoconical- or truncated pyramid-shaped support structure formed by several precast concrete panels according to claim 1, characterized in that the panels (1) have a thickening in the upper portion having a thickness at least twice the minimum thickness of the panel on which a steel tower is coupled by means of a hollow cylinder-shaped transition part of a mixed steel-concrete composition, in which its height is less than half its outer diameter and its wall thickness is at least twice the minimum thickness of the precast panels forming the support structure.

* * * * *